(12) United States Patent
Richardson et al.

(10) Patent No.: US 10,678,744 B2
(45) Date of Patent: Jun. 9, 2020

(54) METHOD AND SYSTEM FOR LOCKLESS INTERPROCESSOR COMMUNICATION

(75) Inventors: Raymond Richardson, Richmond, CA (US); Mark Dapoz, Kanata (CA)

(73) Assignee: Wind River Systems, Inc., Alameda, CA (US)

( * ) Notice: Subject to any disclaimer, the term of this patent is extended or adjusted under 35 U.S.C. 154(b) by 668 days.

(21) Appl. No.: 12/772,433

(22) Filed: May 3, 2010

(65) Prior Publication Data

US 2011/0271060 A1 Nov. 3, 2011

(51) Int. Cl.
*G06F 15/167* (2006.01)
*G06F 9/52* (2006.01)
*G06F 9/54* (2006.01)

(52) U.S. Cl.
CPC ......... *G06F 15/167* (2013.01); *G06F 9/526* (2013.01); *G06F 9/544* (2013.01)

(58) Field of Classification Search
CPC ......... G06F 15/167; G06F 9/544; G06F 9/526
USPC ....................................................... 709/213
See application file for complete search history.

(56) References Cited

U.S. PATENT DOCUMENTS

| | | | |
|---|---|---|---|
| 4,394,730 A * | 7/1983 | Suzuki et al. ................ | 718/103 |
| 4,914,570 A * | 4/1990 | Peacock ................ | G06F 9/4856 709/201 |
| 5,109,512 A * | 4/1992 | Bahr .................... | G06F 9/5033 718/103 |
| 5,490,261 A * | 2/1996 | Bean .................. | G06F 12/0811 711/121 |
| 5,560,034 A * | 9/1996 | Goldstein ............. | G06F 9/3879 345/502 |
| 5,592,671 A * | 1/1997 | Hirayama ............. | G06F 9/4881 718/104 |
| 5,793,994 A * | 8/1998 | Mitchell et al. .............. | 710/105 |
| 5,966,547 A * | 10/1999 | Hagan et al. .................. | 710/57 |
| 6,529,983 B1 * | 3/2003 | Marshall .................. | G06F 9/52 710/200 |
| 6,691,190 B1 * | 2/2004 | Burroughs et al. .......... | 710/100 |
| 6,795,901 B1 * | 9/2004 | Florek et al. ............... | 711/152 |
| 7,035,908 B1 * | 4/2006 | Williams .............. | G06F 15/167 709/201 |
| 7,870,195 B1 * | 1/2011 | Meiri ............................ | 709/206 |

(Continued)

FOREIGN PATENT DOCUMENTS

WO WO 2009077429 * 6/2009

OTHER PUBLICATIONS

"Message." Dictionary.com Unabridged. Random House, Inc. Jun. 3, 2014. <Dictionary.comhttp://dictionary.reference.com/browse/message>.*

*Primary Examiner* — Philip J Chea
*Assistant Examiner* — Wing Ma
(74) *Attorney, Agent, or Firm* — Fay Kaplun & Marcin, LLP (57) ABSTRACT

A computer readable storage medium storing a set of instructions executable by a processor. The set of instructions is operable to receive, from a first processor, a message to be sent to a second processor; store the message in a portion of a shared memory, the shared memory being shared by the first processor and the second processor; store, in an instruction list stored in a further portion of the shared memory, an instruction corresponding to the message; and prompt the second processor to read the message list.

17 Claims, 6 Drawing Sheets

(56) References Cited

U.S. PATENT DOCUMENTS

| | | | |
|---|---|---|---|
| 8,286,188 B1* | 10/2012 | Brief | G06F 9/544 719/312 |
| 8,761,188 B1* | 6/2014 | Krikelis | G06F 15/7896 370/412 |
| 2002/0059165 A1* | 5/2002 | Hersh | G06F 9/52 |
| 2003/0041173 A1* | 2/2003 | Hoyle | 709/248 |
| 2003/0088626 A1* | 5/2003 | Gupta | G06F 15/16 709/206 |
| 2003/0182465 A1* | 9/2003 | Moir | G06F 9/52 719/314 |
| 2004/0068620 A1* | 4/2004 | Van Doren | G06F 12/0804 711/144 |
| 2004/0148472 A1* | 7/2004 | Barroso | G06F 12/0817 711/141 |
| 2005/0188372 A1* | 8/2005 | Inoue et al. | 718/100 |
| 2005/0188373 A1* | 8/2005 | Inoue et al. | 718/100 |
| 2005/0283577 A1* | 12/2005 | Sivaram | G06F 9/526 711/152 |
| 2006/0149861 A1* | 7/2006 | Yamazaki | G06F 13/28 710/22 |
| 2006/0190942 A1* | 8/2006 | Inoue | G06F 9/4856 718/100 |
| 2006/0242257 A1* | 10/2006 | Kuribayashi | G06F 15/16 709/214 |
| 2007/0076735 A1* | 4/2007 | Soo | G06F 13/385 370/412 |
| 2007/0271572 A1* | 11/2007 | Gupta et al. | 719/313 |
| 2008/0229325 A1* | 9/2008 | Supalov | G06F 9/544 719/312 |
| 2009/0043970 A1* | 2/2009 | Jeong | G06F 13/1663 711/149 |
| 2009/0089545 A1* | 4/2009 | Kwon | G06F 15/167 712/36 |
| 2010/0076941 A1* | 3/2010 | Dotsenko | G06F 17/10 707/705 |
| 2010/0095089 A1* | 4/2010 | Kwon | G06F 9/544 712/30 |
| 2010/0287320 A1* | 11/2010 | Querol | G06F 9/544 710/260 |
| 2010/0299472 A1* | 11/2010 | Tanaka et al. | 710/269 |
| 2011/0047310 A1* | 2/2011 | Bonola | G06F 9/4812 710/268 |
| 2011/0093854 A1* | 4/2011 | Blanc | G06F 9/5066 718/101 |
| 2011/0161943 A1* | 6/2011 | Bellows | G06F 9/4843 717/149 |
| 2011/0225588 A1* | 9/2011 | Pollock | G06F 9/32 718/102 |
| 2012/0204183 A1* | 8/2012 | Bayer | G06F 9/5027 718/102 |
| 2012/0210069 A1* | 8/2012 | Bayer | G06F 12/084 711/122 |

\* cited by examiner

METHOD AND SYSTEM FOR LOCKLESS INTERPROCESSOR COMMUNICATION

BACKGROUND

Distributed computing systems, in which tasks are shared among multiple processors, are increasingly common. In such systems, tasks to be performed may be allocated to one among a group of processors. Processors may need to send messages to one another in a manner that allows operating software to manage resources deterministically.

SUMMARY OF THE INVENTION

A computer readable storage medium stores a set of instructions executable by a processor. The set of instructions is operable to receive, from a first processor, a message to be sent to a second processor; store the message in a portion of a shared memory, the shared memory being shared by the first processor and the second processor; store, in an instruction list stored in a further portion of the shared memory, an instruction corresponding to the message; and prompt the second processor to read the message list.

A system includes a first processor, a second processor, a shared memory and an instructions list stored in the shared memory. The first processor stores a message for the second processor in a portion of the shared memory. The first processor creates an entry in the instructions list corresponding to the message. The first processor prompts the second processor to access the instructions list.

DETAILED DESCRIPTION

The exemplary embodiments may be further understood with reference to the following description and the appended drawings, wherein like elements are referred to with the same reference numerals. The exemplary embodiments describe systems and methods for coordinating communications among processors of a multiprocessor system.

Distributed processing computing systems are increasingly common in a variety of settings. Such systems range from personal computers featuring two processing cores to large-scale distributed processing systems for performing extremely complicated tasks. In such environments, each processing core must be able to send messages to each other processing core in order to coordinate the performance of various tasks. Mechanisms for sending such messages should be deterministic and efficient and use minimal resources. Determinism may be advantageous because it allows an upper bound to be placed on the time needed to send, process, and respond to a message.

Figure 1:
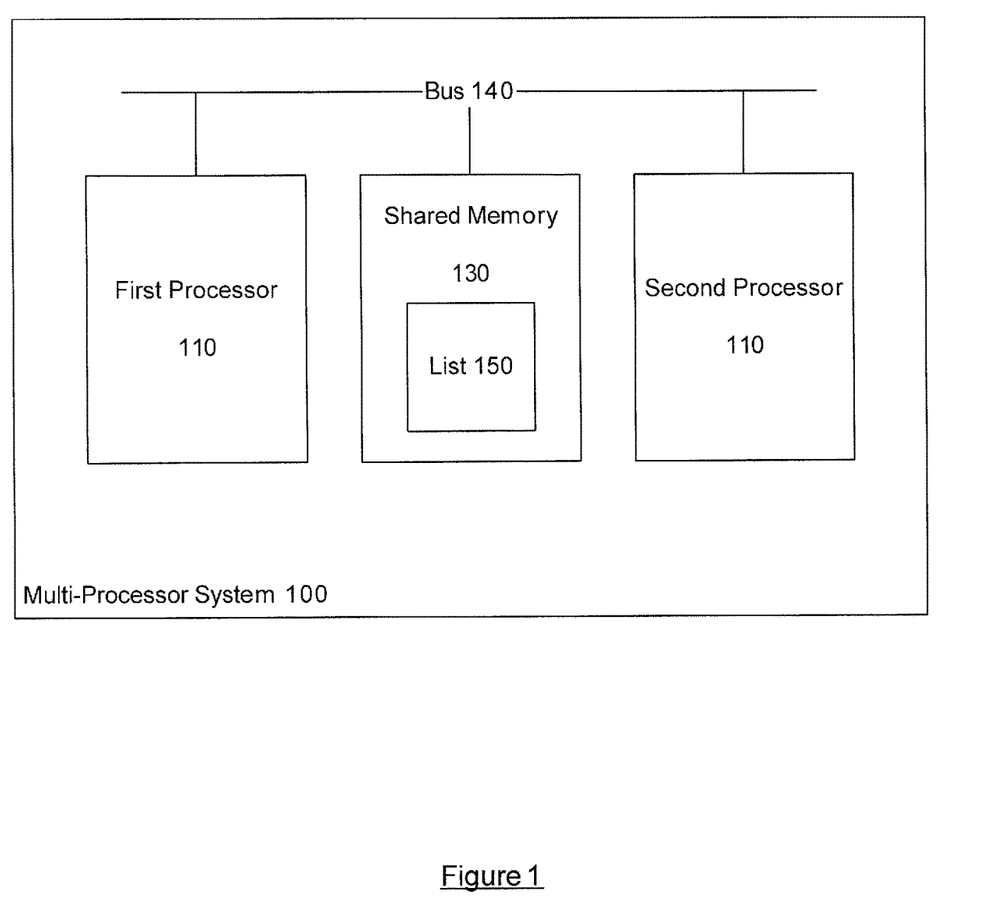
FIG. 1 shows a schematic view of an exemplary multiprocessor system.

FIG. 1 illustrates a schematic view of an exemplary multiprocessor system 100. Those of skill in the art will understand that while the exemplary embodiments are described with reference to a single computing system including two processors as illustrated in FIG. 1, the broader principles described herein are equally applicable to other types of distributed multiprocessor computing systems that may share a memory in the manner to be described below.

The system 100 includes a first processor 110 and a second processor 120, which may be any type of microprocessor capable of executing instructions embodied in code. The hardware of the first processor 110 and the second processor 120 may be substantially similar or may differ from one another. The system 100 further includes a shared memory 130 which may be utilized as will be described below. The shared memory 130 may be a separate physical memory dedicated for the purpose of coordinating interprocessor communications or may be a portion of a larger memory that is also used for other tasks, such as a partition of a hard drive or a segment of a computer's RAM. Data may be passed among the first processor 110, the second processor 120, and the shared memory 130 by way of a bus 140.

The shared memory 130 may comprise a plurality of blocks to be used for sending messages between the first processor 110 and the second processor 120. The message blocks may be of substantially the same size or may differ for the performance of differing types of tasks. Each message block may include a status indicator, which may be marked one of "FREE", "SENT" and "PROCESSED". Both the first processor 110 and the second processor 120 may read and write data in the shared memory 130, but writing permissions for individual elements on the shared memory 130 may be modified as will also be described in further detail below. The shared memory 130 may store (e.g., in one of the blocks dedicated for this purpose) an instructions list 150 (or "list 150") describing the contents of the shared memory 130, the operation of which will be described in further detail below. In this exemplary embodiment, the list 150 is operable to store instructions sent from the first processor 110 to the second processor 120. In another exemplary embodiment, the memory 130 may store a further list for sending instructions from the second processor 120 to the first processor 110; similarly, in systems with more than two processors, each pair of processors may share two lists, one for communications in each direction.

Figure 2:
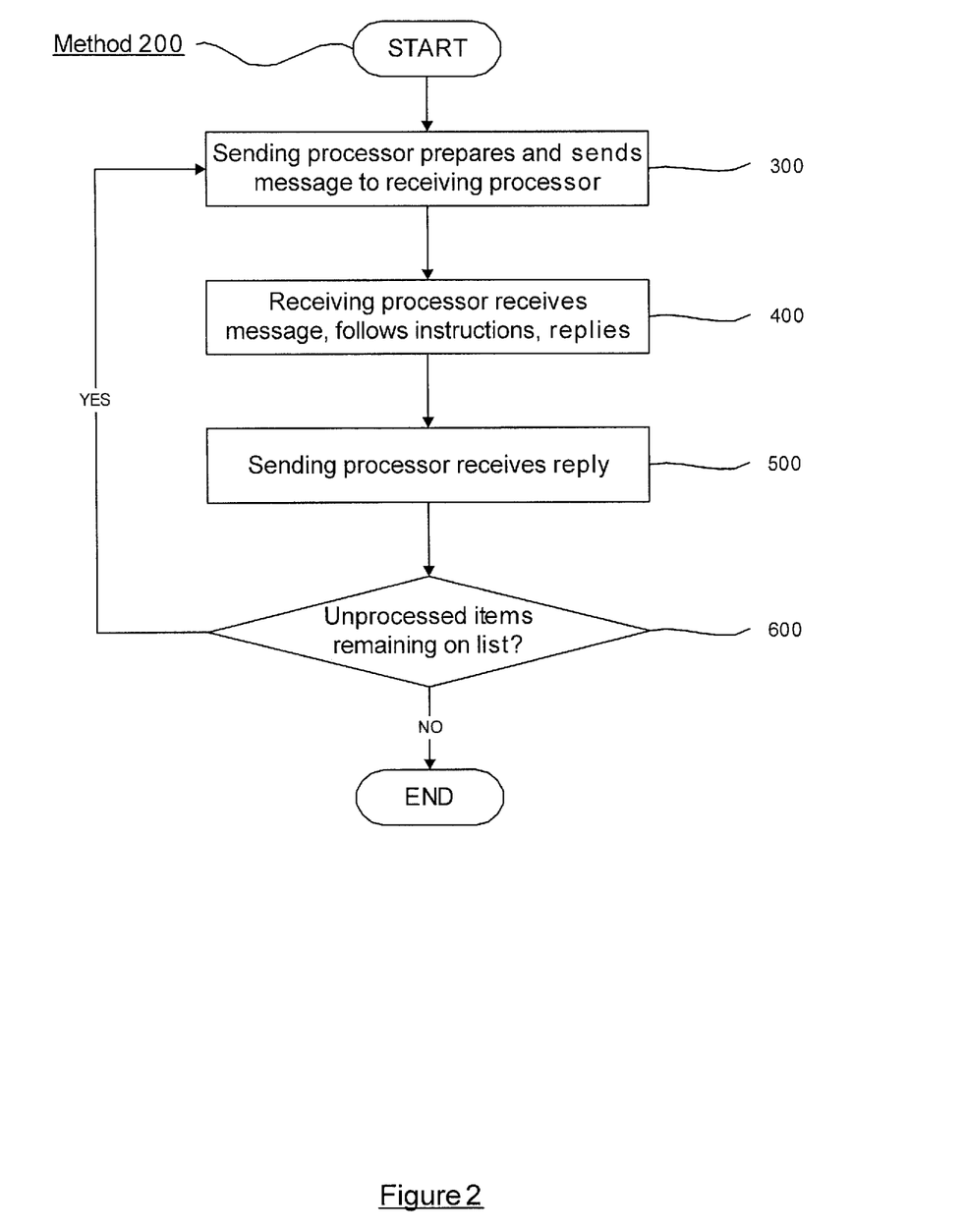
FIG. 2 shows an exemplary method for performing communication between processors in a multiprocessor system.

FIG. 2 illustrates an exemplary method 200 by a list, such as the list 150 of FIG. 1, for sending communications from one processor to another, such as from the first processor 110 to the second processor 120 of FIG. 1. The exemplary method 200 will describe a "sending processor" and a "receiving processor"; the method 200 will be described using an exemplary message to be sent from the first processor 110 to the second processor 120, and thus the terms "first processor 110" and "sending processor" will be used interchangeably, as will the terms "second processor 120" and "receiving processor". It will be apparent to those of skill in the art that the method to be described may be used in substantially an equivalent manner to coordinate the sending of a message from the second processor 120 to the first processor 110, or among processors in an architecture including three or more processors. FIG. 2 illustrates the overarching method 200, and FIGS. 3-5, described in detail below, will illustrate further methods representing substeps of individual steps of the method 200. It should be noted that FIG. 2 illustrates actions taken by both the first processor 110 and the second processor 120 in a single flow. However, it is not necessary for the two processors to synchronize on a per-message basis in this manner, and the steps do not necessarily occur in this order; rather, they are merely shown in this order for purposes of clarity.

In step 300, the first processor 110 prepares a message and sends it to the second processor 120. In step 400, the second processor 120 receives the message, performs any actions that may be required in accordance with the message, and replies to the first processor 110. In step 500, the first processor 110 receives the reply. In step 600, instructions governing the instructions list 150 of the shared memory 130 determine whether the instructions list 150 contains further items to be processed. If so, the method returns to step 300; if not, the method terminates.

Figure 3:
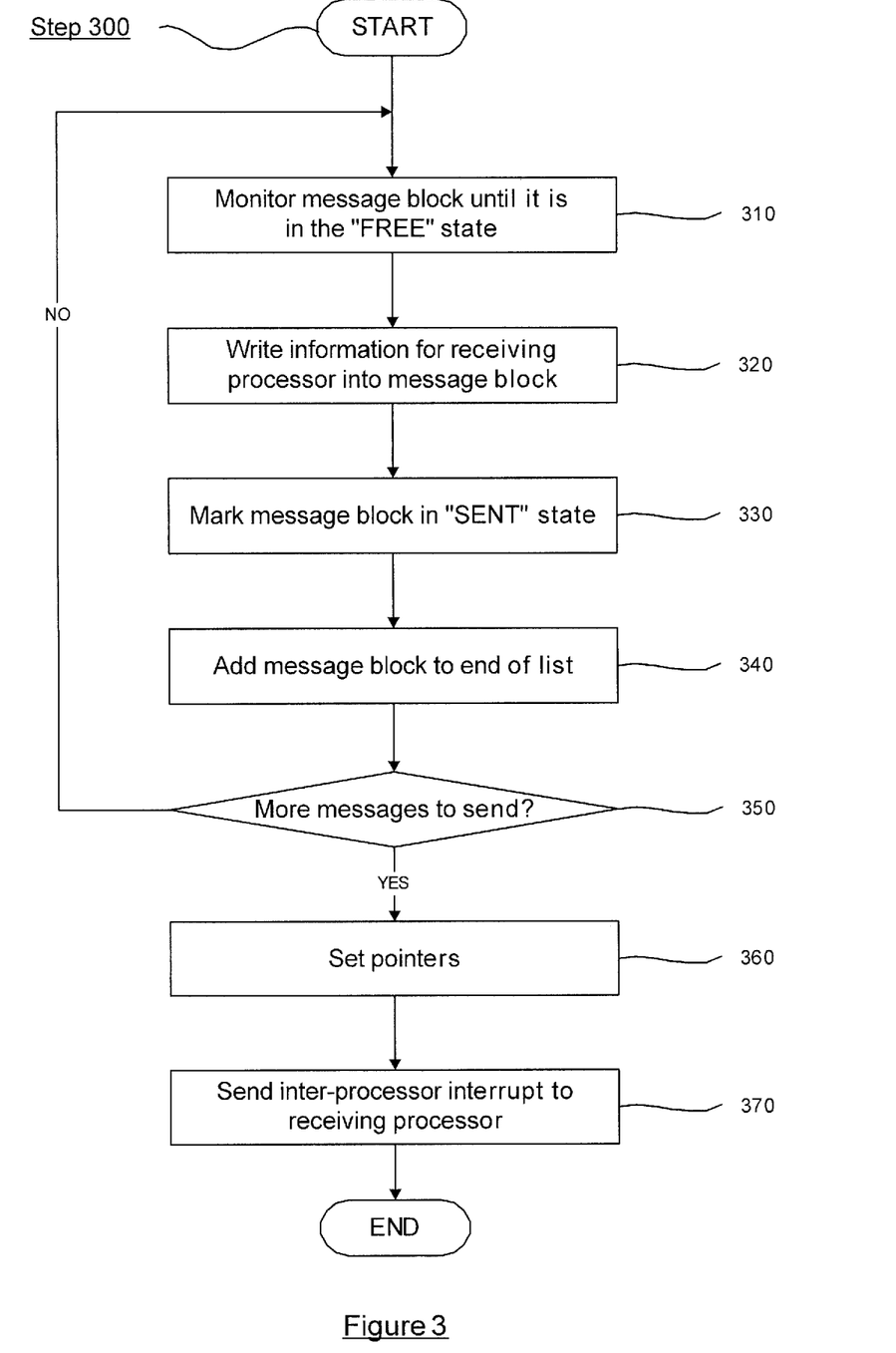
FIG. 3 shows a method comprising exemplary substeps of a step of the method of FIG. 2.

Step 300, illustrated in detail in FIG. 3, governs the process by which a message is initially sent from a sending processor to a receiving processor via the shared memory 130. In step 310, the first processor 110 monitors the shared memory 130 until an appropriate message block is marked "FREE", and selects an appropriate block once it is so marked. The selection may be a block that has just been marked "FREE" or may be an appropriate block that was previously marked "FREE" and was detected by the first processor 110 upon an initial examination of the shared memory 130. In step 320, the first processor 110 writes information for the second processor 120 into the selected message block. The data written in the block may be any generalized data that may need to be sent from one processor of a distributed computing system to another. In step 330, the first processor 110 changes the status of the message block from "FREE" to "SENT".

In step 340, the first processor 110 adds the newly-written message to the end of the instructions list 150. The entry in the instructions list 150 may include a reference to the location of the message block in the shared memory 130 where the referenced message has been stored. Next, in step 350, the first processor 110 determines whether it needs to send a further message or messages to the second processor 120. If so, the method returns to step 310, and the first processor 110 may repeat the message-writing process as described above in steps 310-340. If not, the method continues to step 360.

In step 360, the first processor 110 updates the head pointer for the list such that it points to the first instruction pending for the second processor 120. Once this is done, the first processor 110 sends an inter-processor interrupt to the second processor 120 via the bus 140 in step 370. The inter-processor interrupt serves to alert the second processor 120 that the instructions list 150 contains instructions pending for it. At this point, the first processor 110 is done with the message-sending process and may perform other tasks until it receives a reply from the second processor, as will be discussed below.

Figure 4:
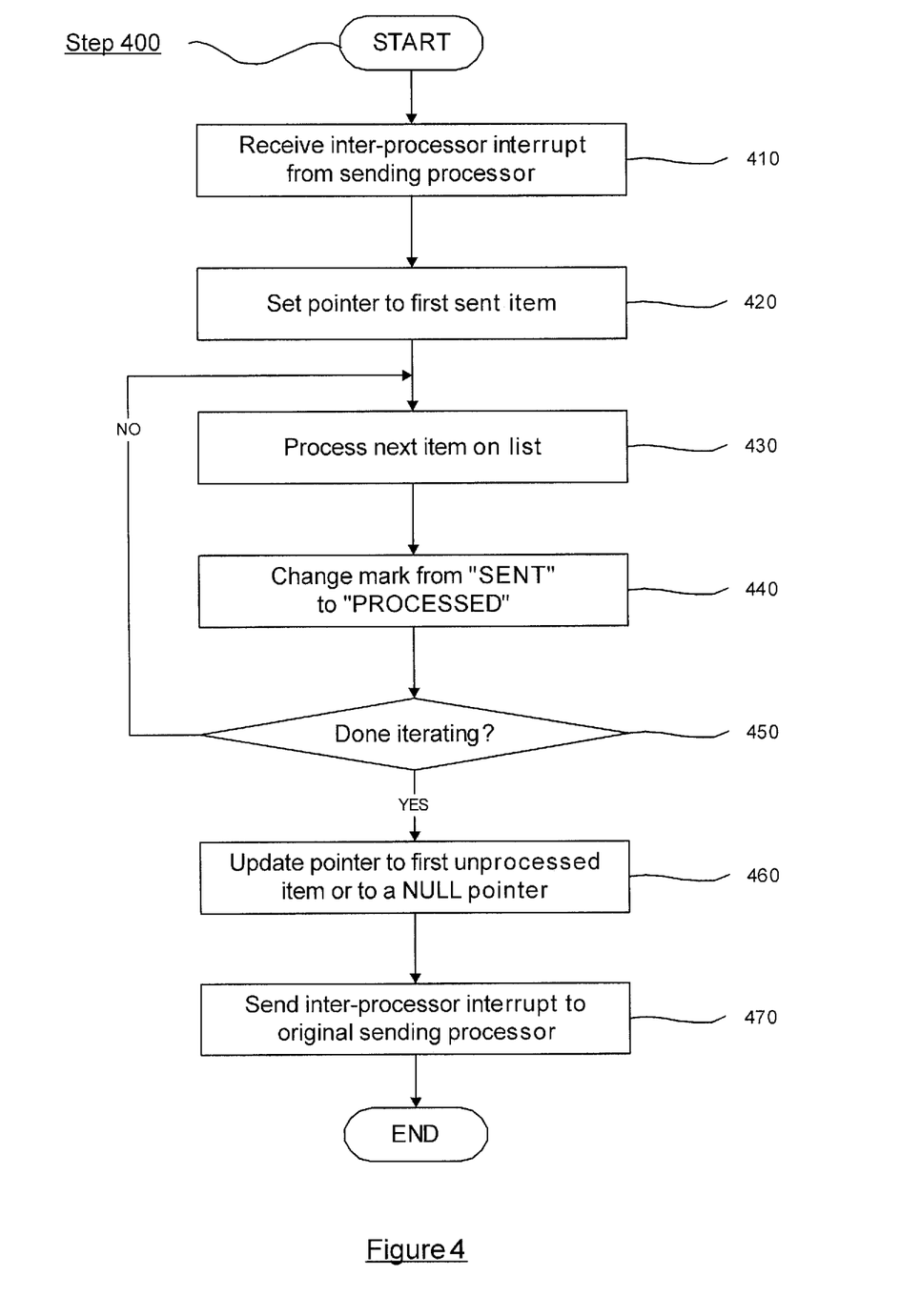
FIG. 4 shows a further method comprising exemplary substeps of a step of the method of FIG. 2.

Step 400, illustrated in detail in FIG. 4, illustrates the process by which a receiving processor receives instructions from a sending processor and acts on those instructions. As above, the first processor 110 of FIG. 1 will be treated as the sending processor, and the second processor 120 of FIG. 1 will be treated as the receiving processor. In step 410, the second processor 120 receives the inter-processor interrupt that was sent by the first processor 110 in step 370. As stated above, this prompts the second processor 120 to examine the contents of the list 150. In step 420, the second processor 120 sets its pointer to the first sent item on the list 150. If it presently points to a sent item, the pointer does not need to be changed in this step; if not, the pointer is set to the head of the list 150. Next, in step 430, the second processor 120 performs the next item on the list in accordance with the contents of the message block in shared memory 130. It will be apparent that the actions performed may vary depending on the nature of the instructions stored in the list, and may be any type of action that may be performed by one processor in a distributed processing environment.

After performing the list item, in step 440 the second processor 120 changes the memory block containing the item from "SENT" to "PROCESSED". As is apparent, this denotes that the item contained in the memory block has been processed. Next, in step 450, the second processor 120 determines whether it is done iterating, i.e., whether there are more items remaining to be processed in the list. If the list contains more items, then the method returns to step 430, and the second processor 120 continues performing items on the list 150. In a preferred embodiment, the second processor 120 may be limited to performing steps 430 and 440 a limited times during a single performance of the method 400 in order to preserve determinism. If the list is complete, then the second processor 120 continues to step 460, where it updates its pointer to point to either the first item not yet processed, or to a NULL pointer if all items are processed. Once this is done, the second processor 120 sends an inter-processor interrupt to the first processor 110 in step 470 to indicate that it has performed the tasks indicated by the instructions list 150. At this point, the second processor 120 is done performing its tasks according to the exemplary method 200, and may perform other, unrelated tasks as necessary.

Figure 5:
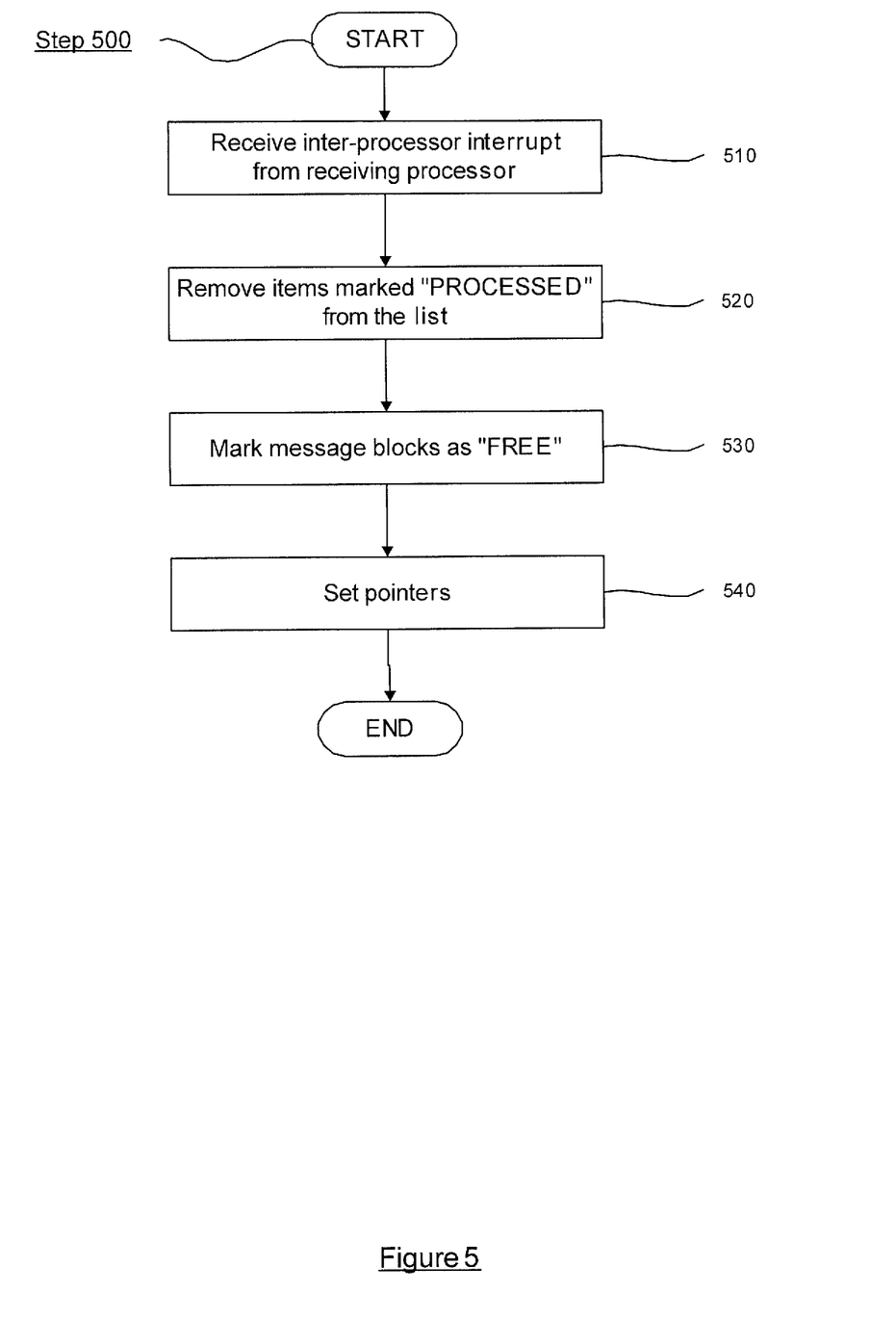
FIG. 5 shows a further method comprising exemplary substeps of a step of the method of FIG. 2.

Step 500, illustrated in detail in FIG. 5, illustrates the process by which a sending processor receives a reply from a receiving processor and acts to acknowledge the reply. As above, the first processor 110 of FIG. 1 will be treated as the sending processor, and the second processor 120 of FIG. 1 will be treated as the receiving processor. In step 510, the first processor 110 receives the inter-processor interrupt sent by the second processor 120 in step 470. This interrupt informs the first processor 110 that the second processor 120 has received the message or messages sent to it by the first processor 110. In step 520, the first processor 110 examines the shared memory 130, and removes items that have been marked "PROCESSED" from the instructions list 150.

In step 530, the first processor 110 changes the state of the "PROCESSED" message blocks to "FREE", which has the effect of freeing the blocks to handle other messages, such as subsequent messages from the first processor 110 to the second processor 120, messages from the second processor 120 to the first processor 110, or, in systems with more processors, messages to and from other processors. At this point, the use of blocks that have been marked "FREE" is complete; the blocks may optionally be added to a list of free blocks for reallocation to other purposes, but this is outside the scope of the exemplary method. In step 540, the first processor 110 updates its pointers. After step 540, the method terminates. Subsequently, if there are unprocessed items remaining on the list 150, the process may begin again and may repeat until the list 150 is empty.

Figure 6:
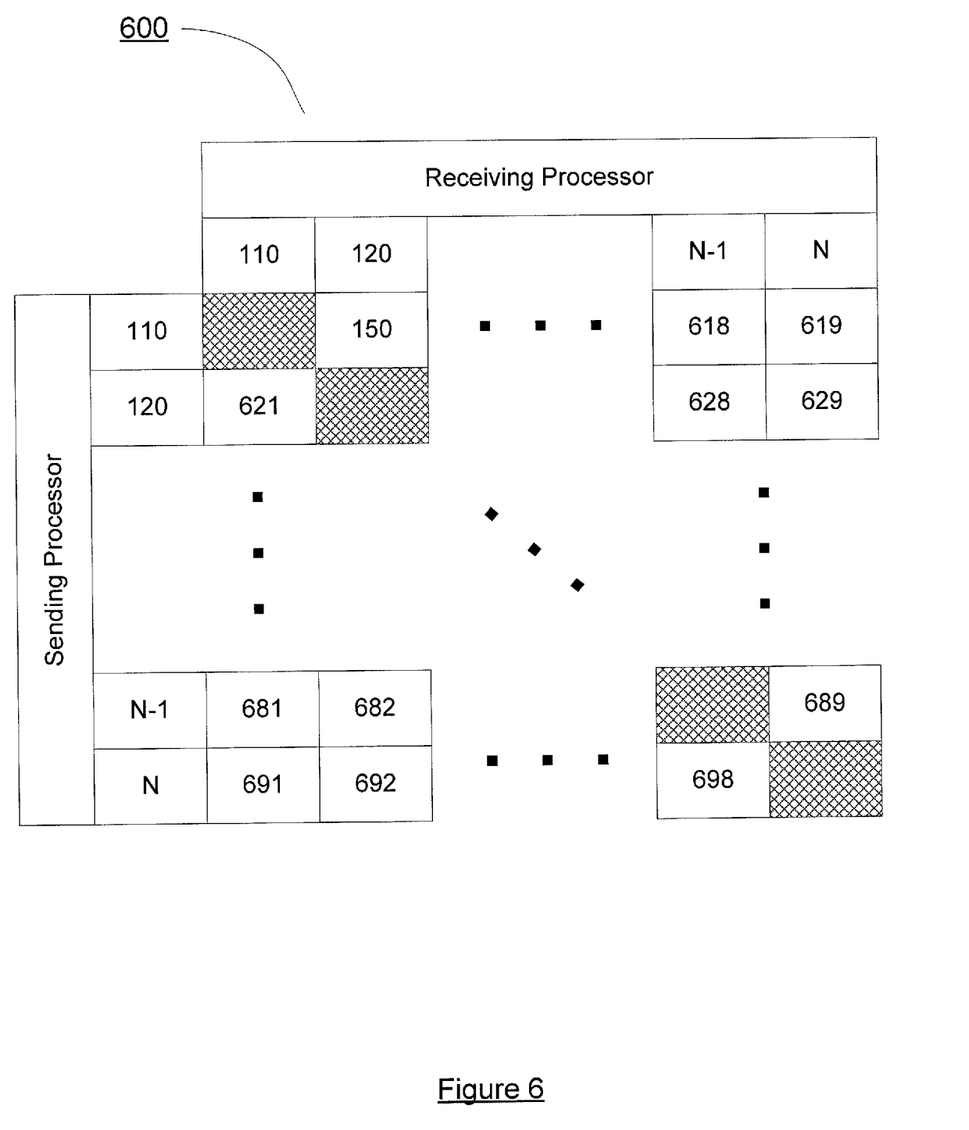
FIG. 6 shows an exemplary matrix showing a mechanism for communication among an indefinite number of processors in a multiprocessor system.

FIG. 6 illustrates an exemplary N×N matrix 600 illustrating a group of instructions lists that may be used for a group of N processors to communicate with one another. Each of the lists may operate substantially as described above. As indicated, the processors listed along the vertical axis are sending processors (e.g., operating as the processor 110 is described above), and the processors listed along the horizontal axis are receiving processors (e.g., operating as the processor 120 described above. Instructions list 150, described above, carries instructions from processor 110 to processor 120. Lists 618 and 619 carry instructions from processor 110 to processors N−1 and N, respectively. Lists 621, 628 and 629 carry instructions from processor 120 to processors 110, N−1 and N, respectively. Lists 681, 682 and 689 carry instructions from processor N−1 to processors 110, 120 and N, respectively. Lists 691, 692 and 698 carry instructions from processor N to processors 110, 120 and N−1, respectively. The shaded areas indicate the absence of the need for a list to convey instructions from each of the processors to itself.

The exemplary embodiments may be used for the transmission of any type of data, instructions, or other messages from one processor in a multi-processor architecture to another. This may include, but is not limited to, forwarding requests for primary allocation, forwarding interrupts from one processor to another, or forwarding any type of request or service from one processor to another. The exemplary embodiments thus present a method by which various standard idioms of programming may be performed more efficiently.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A non-transitory computer readable storage medium storing a set of instructions executable by a first processor configured to be one of a plurality of processors in a system, the set of instructions, when executed by the first processor, causing the first processor to perform operations comprising:
   storing a message to be read by a second processor of the plurality of processors in one of a plurality of memory blocks included within a portion of a shared memory, wherein storing the message includes setting a status indicator corresponding to the one of the plurality of the memory blocks to a first indication and wherein the shared memory is configured to be shared by at least the first processor and the second processor;
   storing, in an instruction list conveying instructions only from the first processor and only to the second processor and stored in a further portion of the shared memory, an indication corresponding to a location of the one of the plurality of memory blocks containing the message;
   prompting the second processor to read the instruction list, wherein the second processor determines the location of the one of the plurality of memory blocks containing the message based on the indication and sets the status indicator corresponding to the one of the plurality of memory blocks to a second indication; and
   removing the indication corresponding to the message from the instruction list based on identifying that the status indicator corresponding to the one of the plurality of memory blocks is set to the second indication.

2. The non-transitory computer readable storage medium of claim 1, wherein the operations further comprise:
   receiving, from the second processor, an indication that the second processor has read the message from the one of the plurality of memory blocks wherein the indication prompts the first processor to examine the shared memory.

3. The non-transitory computer readable storage medium of claim 2, wherein the operations further comprise:
   generating an indication that the one of the plurality of memory blocks can be used for a further message.

4. The non-transitory computer readable storage medium of claim 1, wherein the second processor is prompted to read the instruction list by an inter-processor interrupt sent by the first processor.

5. The non-transitory computer readable storage medium of claim 2, wherein the first processor is prompted to examine the shared memory by an inter-processor interrupt sent by the second processor.

6. The non-transitory computer readable storage medium of claim 1, wherein setting the status indicator to the first indication includes changing a state of the one of the plurality of memory blocks from a free state to a sent state.

7. The non-transitory computer readable storage medium of claim 3, wherein generating the indication that the one of the plurality of memory blocks can be used for a further message comprises changing a state of one of the plurality of memory blocks from a received state to a free state.

8. A system, comprising:
   a plurality of processors including at least a first processor and a second processor;
   a shared memory; and
   an instructions list conveying instructions only from the first processor and only to the second processor and stored in the shared memory,
   wherein the first processor stores a message to be read by the second processor in one of a plurality of memory blocks included within a portion of the shared memory, wherein storing the message includes setting a status indicator corresponding to the one of the plurality of the memory blocks to a first indication, wherein the first processor creates an entry in the instructions list, the entry including an indication corresponding to the location of the one of the plurality of memory blocks containing the message, and wherein the first processor prompts the second processor to access the instructions list,
   wherein the second processor determines the location of the one of the plurality of memory blocks containing the message based on the indication and sets the status indicator corresponding to the one of the plurality of memory blocks to a second indication,
   wherein the first processor removes the entry corresponding to the message from the instruction list based on identifying that the status indicator corresponding to the one of the plurality of memory blocks is set to the second indication.

9. The system of claim 8, wherein the first processor prompts the second processor to access the instructions list by sending an inter-processor interrupt.

10. The system of claim 8, wherein the second processor reads the message and acts in accordance with the message.

11. The system of claim 10, wherein setting the status indicator to the second indication indicates that the message has been read, and wherein the second processor prompts the first processor to examine the shared memory.

12. The system of claim 11, wherein the second processor prompts the first processor by sending an inter-processor interrupt.

13. The system of claim 8, wherein storing the message in the one of the plurality of memory blocks comprises setting a state of the one of the plurality of memory blocks to a sent state.

14. The system of claim 8, wherein the first processor stores a plurality of messages for the second processor in at least a set of the plurality of message blocks, and wherein the first processor creates a plurality of entries in the instructions list, each of the plurality of entries corresponding to one of the plurality of messages.

15. The system of claim 8, wherein the system further comprises a further instructions list stored in the shared memory, and wherein the second processor stores a further message for the first processor in a further one of the plurality of message blocks, and wherein the second processor creates an entry in the further instructions list corresponding to the further message, and wherein the second processor prompts the first processor to inspect the further instructions list.

16. A method comprising:
- storing, by a first processor, a message in one of a plurality of memory blocks included within a portion of a shared memory, wherein storing the message includes setting a status indicator corresponding to the one of the plurality of the memory blocks to a first indication and wherein the shared memory being shared by the first processor and the second processor;
- storing, in an instruction list conveying instructions only from the first processor and only to the second processor and stored in a further portion of the shared memory, an indication corresponding to a location of the one of the plurality of memory blocks containing the message;
- prompting the second processor to read the instruction list, wherein the second processor determines the location of the one of the plurality of memory blocks containing the message based on the indication and sets the status indicator corresponding to the one of the plurality of memory blocks to a second indication; and
- removing the indication corresponding to the message from the instruction list based on identifying that the status indicator of the one of the plurality of memory blocks is set to the second indication.

17. The method of claim 16, further comprising:
- receiving, by the first processor and from the second processor, an indication that the second processor has read the message from the one of the plurality of memory blocks; and
- prompting the first processor to examine the shared memory.

* * * * *